US00RE35794E

United States Patent [19]

Johnson

[11] E Patent Number: Re. 35,794

[45] Reissued Date of Patent: May 12, 1998

[54] SYSTEM FOR REDUCING DELAY FOR EXECUTION SUBSEQUENT TO CORRECTLY PREDICTED BRANCH INSTRUCTION USING FETCH INFORMATION STORED WITH EACH BLOCK OF INSTRUCTIONS IN CACHE

[75] Inventor: William M. Johnson, Austin, Tex.

[73] Assignee: Advanced Micro Devices, Inc., Sunnyvale, Calif.

[21] Appl. No.: 285,520

[22] Filed: Aug. 4, 1994

Related U.S. Patent Documents

Reissue of:

[64] Patent No.: 5,136,697
Issued: Aug. 4, 1992
Appl. No.: 361,870
Filed: Jun. 6, 1989

[51] Int. Cl.[6] ..... G06F 9/38

[52] U.S. Cl. ..... 395/586; 395/382; 395/584; 395/585; 395/587; 395/421.1; 395/421.11

[58] Field of Search ..... 395/375, 800, 395/421.03, 421.07, 421.1, 421.11, 382, 584, 585, 586, 587

[56] References Cited

U.S. PATENT DOCUMENTS

| | | | |
|---|---|---|---|
| 4,200,927 | 4/1980 | Hughes et al. | 395/375 |
| 4,295,193 | 10/1981 | Pomerene | 395/375 |
| 4,430,706 | 2/1984 | Sand | 395/375 |
| 4,477,872 | 10/1984 | Losq et al. | 395/375 |
| 4,604,691 | 8/1986 | Akagi | 395/375 |
| 4,755,966 | 7/1988 | Lee et al. | 395/375 |
| 4,764,861 | 8/1988 | Shibuya | 395/375 |
| 4,807,115 | 2/1989 | Torug | 395/375 |
| 4,858,104 | 8/1989 | Matsuo et al. | 395/375 |
| 4,860,197 | 8/1989 | Langendorf et al. | 395/375 |
| 4,894,772 | 1/1990 | Langendorf | 395/375 |
| 4,984,154 | 1/1991 | Hanatani et al. | 395/375 |

*Primary Examiner*—Kenneth S. Kim
*Attorney, Agent, or Firm*—Foley & Lardner

[57] ABSTRACT

A super-scaler processor is disclosed wherein branch-prediction information is provided within an instruction cache memory. Each instruction cache block stored in the instruction cache memory includes branch-prediction information fields in addition to instruction fields, which indicate the address of the instruction block's successor and information indicating the location of a branch instruction within the instruction block. Thus, the next cache block can be easily fetched without waiting on a decoder or execution unit to indicate the proper fetch action to be taken for correctly predicted branching.

27 Claims, 7 Drawing Sheets

FOUR - INSTRUCTION DECODER

| | | | |
|---|---|---|---|
| — | S1 | S2 | S3 |
| S4 | S5 | — | — |
| — | T1 | T2 | T3 |
| T4 | — | — | — |

2.25 INSTRUCTIONS/CYCLE

TWO INSTRUCTION DECODER

| | |
|---|---|
| — | S1 |
| S2 | S3 |
| S4 | S5 |
| — | T1 |
| T2 | T3 |
| T4 | — |

1.5 INSTRUCTIONS/CYCLE

SYSTEM FOR REDUCING DELAY FOR EXECUTION SUBSEQUENT TO CORRECTLY PREDICTED BRANCH INSTRUCTION USING FETCH INFORMATION STORED WITH EACH BLOCK OF INSTRUCTIONS IN CACHE

Matter enclosed in heavy brackets [ ] appears in the original patent but forms no part of this reissue specification; matter printed in italics indicates the additions made by reissue.

BACKGROUND OF THE INVENTION

The present invention relates to a method and apparatus for improving processor performance by reducing processing delays associated with branch instructions. In particular, the present invention provides an instruction cache for a super-scalar processor wherein branch-prediction information is provided within the instruction cache.

The time taken by a computing system to perform a particular application is determined by three basic factors, namely, the processor cycle time, the number of processor instructions required to perform the application, and the average number of processor cycles required to execute an instruction. Overall system performance can be improved by reducing one or more of these factors. For example, the average number of cycles required to perform an application can be significantly reduced by employing a multi-processor architecture, i.e., providing more than one processor to execute separate instructions concurrently.

There are disadvantages, however, associated with the implementation of a multi-processor architecture. In order to be effective, multi-processing requires an application that can be easily segmented into independent tasks to be performed concurrently by the different processors. The requirement for a readily segmented task limits the effective applicability of multi-processing. Further, the increase in processing performance attained via multi-processing in many circumstances may not offset the additional expense incurred by requiring multiple processors.

Single-processor hardware architectures that avoid the disadvantages associated with multi-processing have been proposed. These so called "super-scalar" processors permit a sustained execution rate of more than one instruction per processor cycle, as opposed to conventional scalar processors which—while capable of handling multiple instructions in different pipeline stages in one cycle—are limited to a maximum pipeline capacity of one instruction per cycle. In contrast, a super-scalar pipeline architecture achieves concurrency between instructions both in different pipeline stages and within the same pipeline stage.

A super-scalar processor that executes more than one instruction per cycle, however, can only be effective when instructions can be supplied at a sufficient rate. It is readily apparent that instruction fetching can be a limiting factor in overall system performance if the average rate of instruction fetching is less than the average rate of instruction execution. Providing the necessary instruction bandwidth for sequential instructions is relatively easy, as the instruction fetcher can simply fetch several instructions per cycle. It is much more difficult, however, to provide sufficient instruction bandwidth in the presence of non-sequential fetches caused by branches, as the branches make the instruction fetching dependent on the results of instruction execution. Thus, the instruction fetcher can either stall or fetch incorrect instructions when the outcome of a branch is not known.

For example, FIG. 1 illustrates two instruction runs consisting of a number of instructions occupying four instruction-cache blocks (assuming a four-word cache block) in an instruction cache memory. The first instruction run consists of instructions S1–S5 that contain a branch to a second instruction run T1–T4. FIG. 2 illustrates how these instruction runs are sequenced through a four-instruction decoder and a two-instruction decoder, assuming for purposes of illustration that two cycles are required to determine the outcome of a branch. As would be expected, the four-instruction decoder provides a higher instruction bandwidth than the two-instruction decoder, but neither provides sufficient instruction bandwidth for a super-scalar processor. As illustrated in FIG. 3, the instruction bandwidth improves dramatically if the branch delays are reduced to zero.

The dependency between the instruction fetcher and the execution unit caused by branches can be reduced by predicting the outcome of the branch during an instruction fetch without waiting for the execution unit to indicate whether or not the branch should be taken. Branch prediction relies heavily on the fact that the outcome of a branch does not change frequently over a given period of time. The instruction fetcher can predict future branch executions using information collected on the outcome of the previous branch executions performed by the execution unit.

A conventional method for hardware-branch prediction uses a branch target buffer to collect information about the most-recently executed branches. See, for example, "Branch Prediction Strategies and Branch Target Buffer Design", by J.K.F. Lee and A.J. Smith, IEEE Computer, Vol. 17, pp. 6–22, January, 1984. Typically, the branch target buffer is accessed using an instruction address, and indicates whether or not the instruction at that address is a branch instruction. If the instruction is a branch instruction, the branch target buffer indicates the predicted outcome and the target address.

The hit ratio of a branch target buffer, i.e., the probability that a branch is found in the branch target buffer at the time it is fetched, increases as the size of the branch target buffer increases. FIG. 4 is a graph of the hit ratio for a target branch buffer for selected sample benchmark programs, and illustrates the necessity of a relatively large branch target buffer in order to obtain an acceptable prediction accuracy. Accordingly, it would be desirable to provide an improved hardware branch prediction architecture that would require less hardware support as compared with a conventional branch target buffer.

SUMMARY OF THE INVENTION

The present invention provides a super-scalar processor wherein branch-prediction information is provided within an instruction cache memory. Each instruction cache block stored in the instruction cache memory includes branch-prediction information fields in addition to instruction fields, which indicate the address of the instruction block's successor and information indicating the location of a branch instruction within the instruction block. Thus, the next cache block can be easily fetched without waiting on a decoder or execution unit to indicate the proper fetch action to be taken for correctly predicted branching.

More specifically, branch predication is accomplished in accordance with the present invention by loading a plurality of instruction blocks into the instruction cache memory, wherein each of the instruction blocks includes a plurality of instructions and instruction fetch information. The instruction fetch information includes an address tag, a branch block index and a successor index that includes a successor valid bit. A fetch program counter is used to generate and supply a fetch program counter value to the instruction cache memory in order to prefetch one of the plurality of instruction blocks stored in the instruction cache memory. The processor determines whether the successor valid bit of the prefetched instruction block is set to a predetermined condition which indicates that a branch instruction within the prefetched instruction block is predicted as taken. If the successor valid bit is not set to the predetermined condition, the fetch program counter value is incremented and supplied to the instruction cache memory to prefetch a succeeding instruction block. If the successor valid bit is set to the predetermined condition, a predicted target branch address is generated by the instruction cache memory based on information contained in the instruction fetch information field associated with the instruction block. The predicted target branch address and the branch location of the branch instruction within the instruction cache memory is then stored in a branch prediction memory. The branch instruction is subsequently executed with a branch execution unit which generates an actual branch location address and a target branch address for the executed branch instruction. The actual branch location and the target branch address are then respectively compared with the branch location and predicted target branch address stored in the branch prediction memory. A misprediction signal is generated if the compared values are not equal, and the successor valid bit and instruction fetch information are updated for the instruction block in response to misprediction signal.

The utilization of the instruction cache and branch prediction memory as described above, provides branch prediction accuracy substantially identical to that of a target branch buffer without requiring as much hardware support.

BRIEF DESCRIPTION OF THE DRAWINGS

With the above as background, reference should now be made to the following detailed description of the preferred embodiments in conjunction with the drawings, in which.

DETAILED DESCRIPTION OF THE PREFERRED EMBODIMENTS

Figure 5:
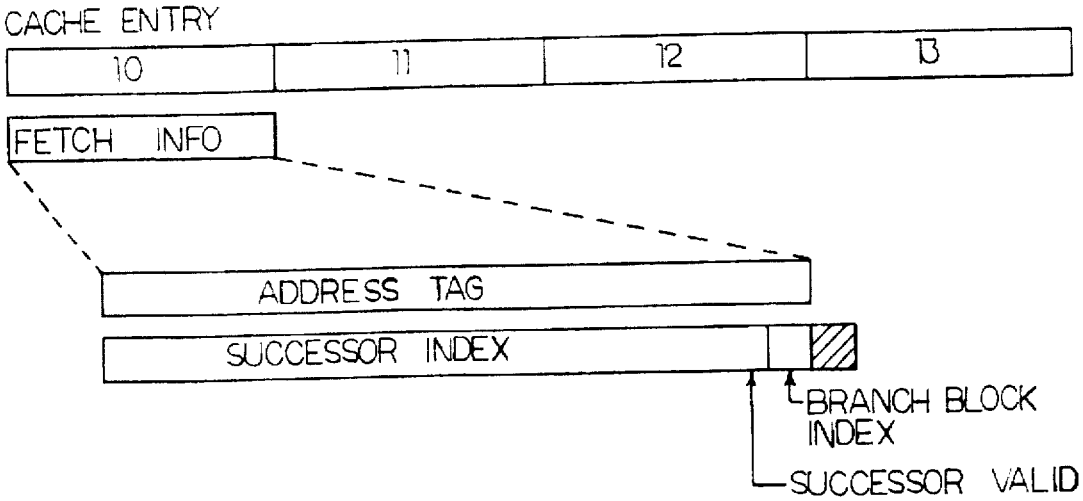
FIG. 5 illustrates a preferred layout for an instruction-cache entry in accordance with the present invention.

The basic operation of an instruction cache for a super-scalar processor in accordance with the present invention will be discussed with reference to FIG. 5, which illustrates a preferred layout for an instruction-cache entry required by the super-scalar processor. In the example illustrated, the cache entry holds four instructions and instruction fetch information which is shown in expanded form to include a conventional address tag field and two additional fields: a successor index field which indicates both the next entry predicted to be fetched and the first instruction within the next entry predicted to be executed, and a branch block index field which indicates the location of a branch point within the instruction block. The successor index field does not specify a full instruction address, but is of sufficient size to select any instruction address within the instruction cache. The successor index field includes a successor valid bit that indicates a branch is predicted to be taken when set, and that a branch is not predicted to be taken when cleared.

Figure 1:
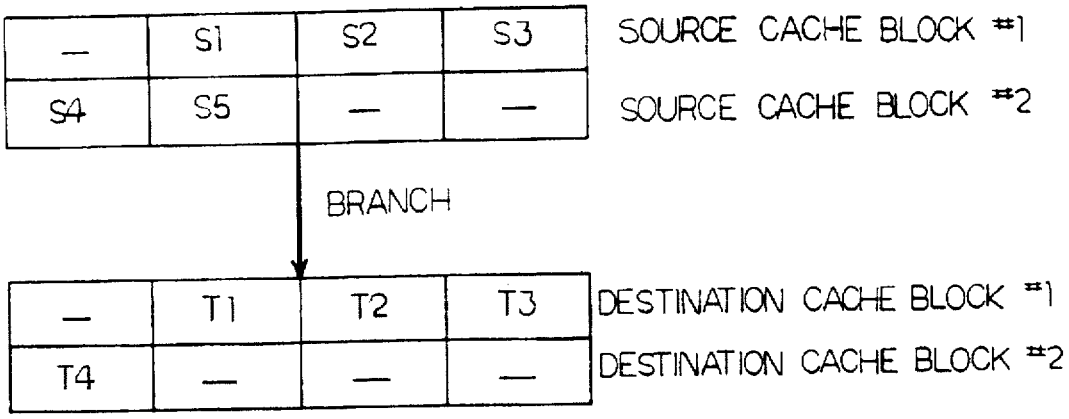
FIG. 1 shows a sequence of two instruction runs to illustrate decoder behavior.
Figure 2:
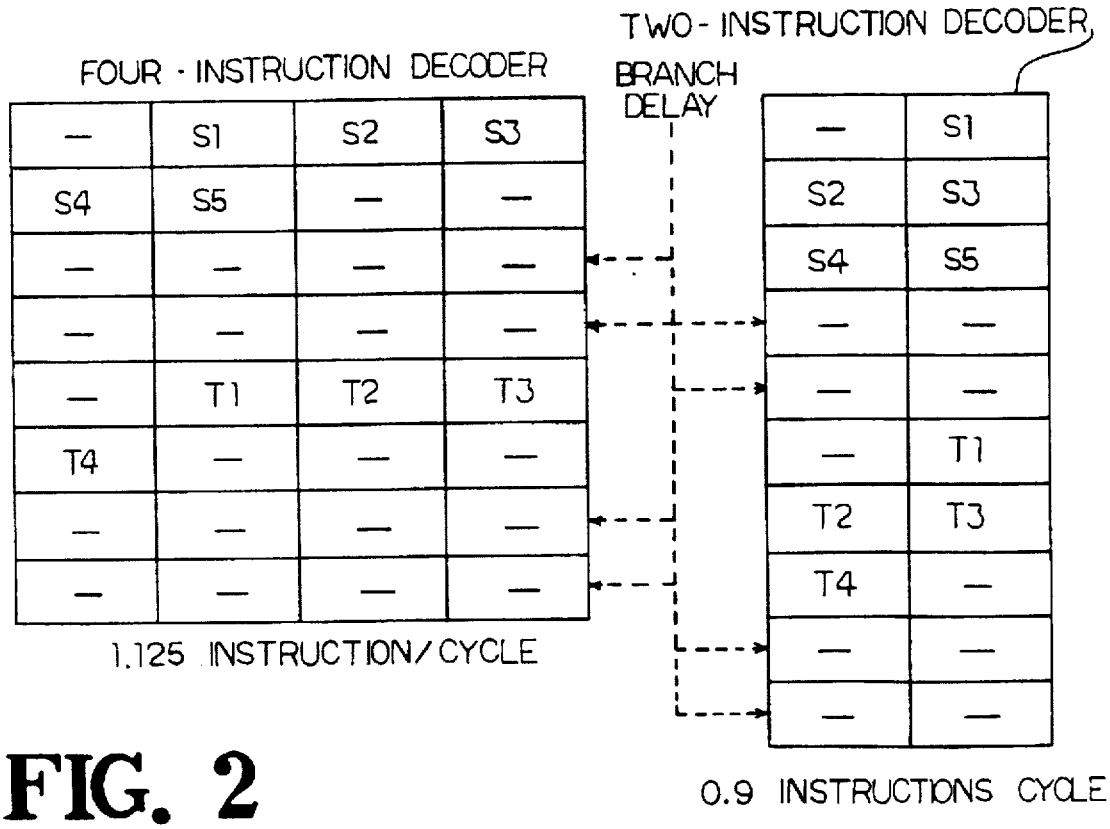
FIG. 2 illustrates the sequencing of the instruction runs shown in FIG. 1 through a two-instruction and four-instruction decoder.
Figures 3, 4:
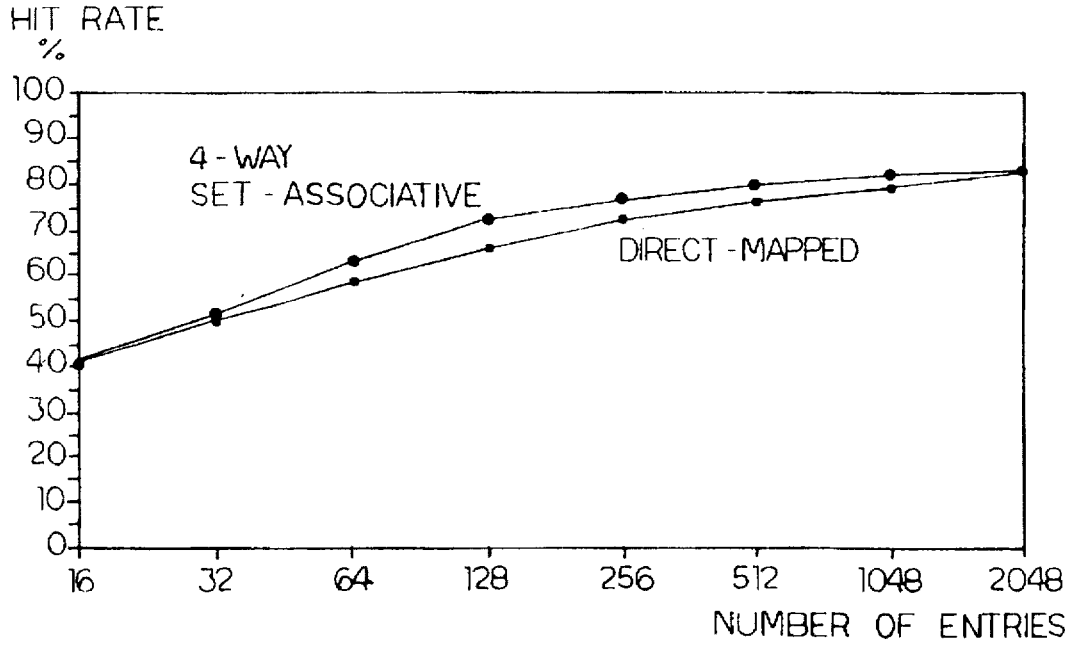
FIG. 3 illustrates the improvements in instruction bandwidth for the instruction runs illustrated in FIG. 2 if branch delays are avoided.
FIG. 4 is a graph of the hit ratio of a target branch buffer.
Figure 6:
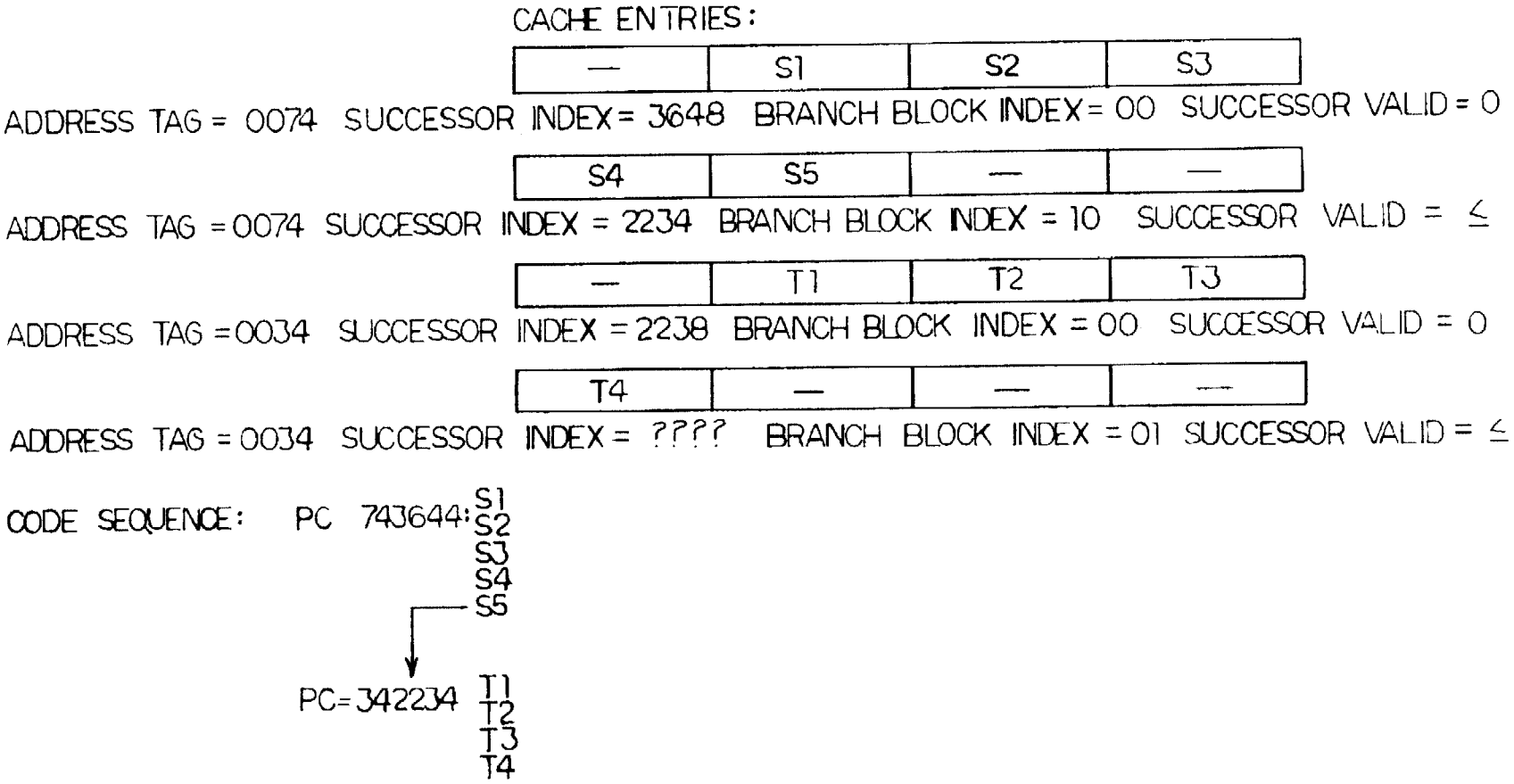
FIG. 6 an example of instruction-cache entries for the code sequence illustrated in FIG. 3.

FIG. 6 illustrates instruction-cache entries for the code sequence shown in FIG. 3, assuming a 64 Kbyte direct-mapped cache and the indicated instruction address. When a cache entry is first loaded, the address tag is set and the successor valid bit is cleared. The default for a newly-loaded entry, therefore, is to predict that a branch is not taken and the next sequential instruction block is to be fetched. FIG. 6 also illustrates that a branch target program counter can be constructed at branch points by concatenating the successor index field of the instruction block where the branch occurs to the address tag of the successor instruction block.

The validity of instructions at the beginning of a current instruction block are preferably determined by the low-order bits of the successor index field in the preceding instruction block. The successor index of the preceding instruction block may point to any instruction within the current instruction block, and instructions up to this point in the current instruction block are not executed by the processor. The validity of instructions at the end of the block are determined by the branch block index, which indicates the point where a branch is predicted to be taken The branch block index is required by an instruction decoder to determine valid instructions, while cache entries are retrieved based on the successor index fields alone.

To check branch predictions, the processor keeps a list of predicted branches, stored in the order in which the branches are predicted, in a branch prediction FIFO associated with the instruction cache. Each entry on the list indicates the location of the branch in the instruction cache, which is identified by concatenating the successor index of the entry preceding the branching entry with the branch location index field. Each entry also contains a complete program-counter value for the target of the branch.

The processor executes all branches in their original program sequence with a branch execution unit, and compares information resulting from the execution of the branches with information at the head of the list of predicted branches. The following conditions must hold for a successful branch prediction. First, if the branch is taken, its location in the instruction cache must match the location of the next branch on the list contained in the branch prediction FIFO. This condition is required to detect a taken branch that was predicted to be not taken. Secondly, the predicted target address of the branch at the head of the list must match the next instruction address determined by executing the branch.

The second comparison is relevant only if the locations match, and is required primarily to detect a branch which was not taken that was predicted to be taken. However, as the predicted target address is based on the address tag of the successor block, this comparison also detects that cache replacement during execution has removed the original target entry. In addition, comparing program-counter values checks that indirect branches were properly predicted.

The branch is mispredicted if either or both of the above-described conditions does not hold. When a misprediction occurs, the appropriate cache entry must be fetched using the location of the branch determined by the execution unit. The successor valid bit and instruction fetch information for the incorrect instruction block must also be updated based on the misprediction to reflect the actual result of the execution of the branch. For example, the successor valid bit is cleared if a branch had been predicted as taken but was not taken, so that on the next fetch of the instruction block the branch will be predicted as not taken. Thus, the successor valid bit and instruction fetch information alway reflect the actual result of the previous execution of the branch instruction.

Figure 7:
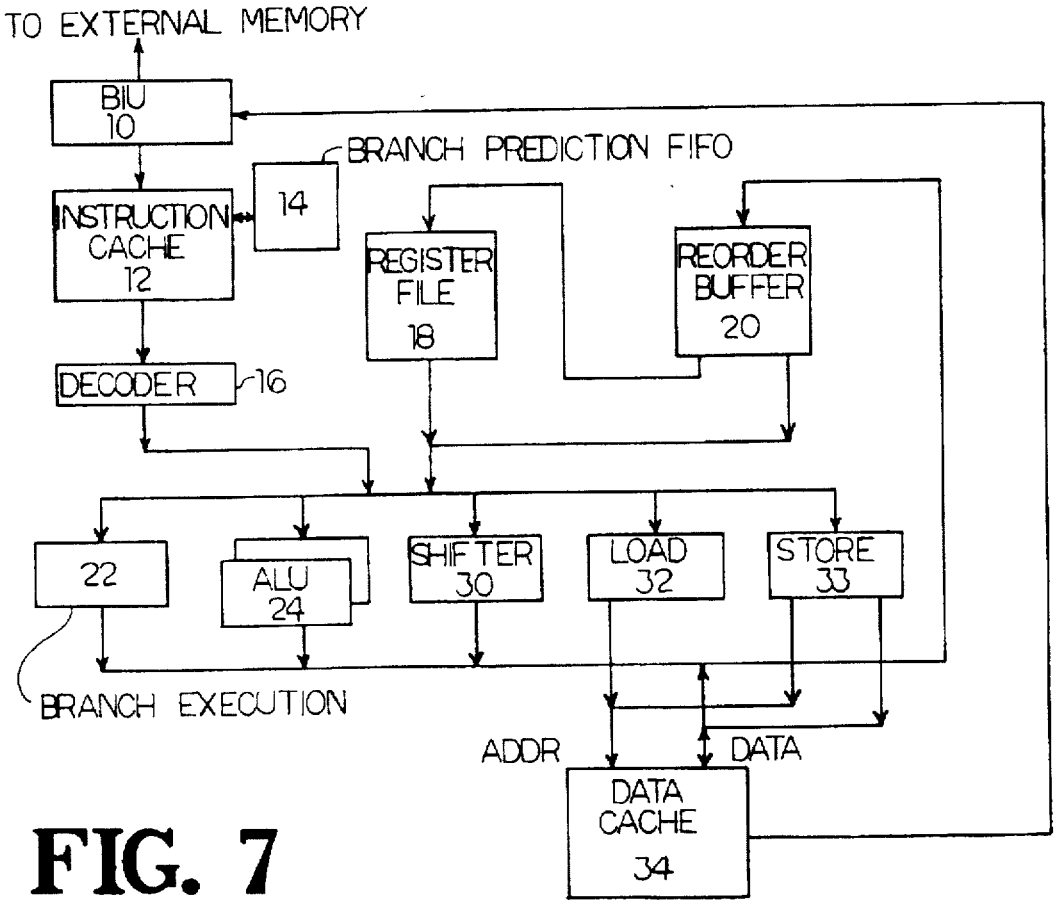
FIG. 7 is a block diagram of a super-scalar processor according to the present invention.

With the above as background, reference should now be made to FIG. 7 for a detailed description of a preferred embodiment of the invention. FIG. 7 illustrates a block diagram of a super-scalar processor that includes a bus interface unit (BIU) 10, an instruction cache 12, a branch prediction FIFO 14, an instruction decoder 16, a register file 18, a reorder buffer 20, a branch execution unit 22, an arithmetic logic unit (ALU) 24, a shifter unit 30, a load unit 32 a store unit 33, and a data cache 34.

The reorder buffer 20 is managed as a FIFO. When an instruction is decoded by the instruction decoder 16, a corresponding entry is allocated in the reorder buffer 20. The result value of the decoded instruction is written into the allocated entry when the execution of the instruction is completed. The result value is then written into the register file 18 if there are no exceptions associated with the instruction. If the instruction is not complete when its associated entry reaches the head of the reorder buffer 20, the advancement of the reorder buffer 20 is halted until the instruction is completed, additional entries, however, can continue to be allocated. If there is an exception or branch misprediction, the entire contents of the reorder buffer 20 are discarded.

Figure 8:
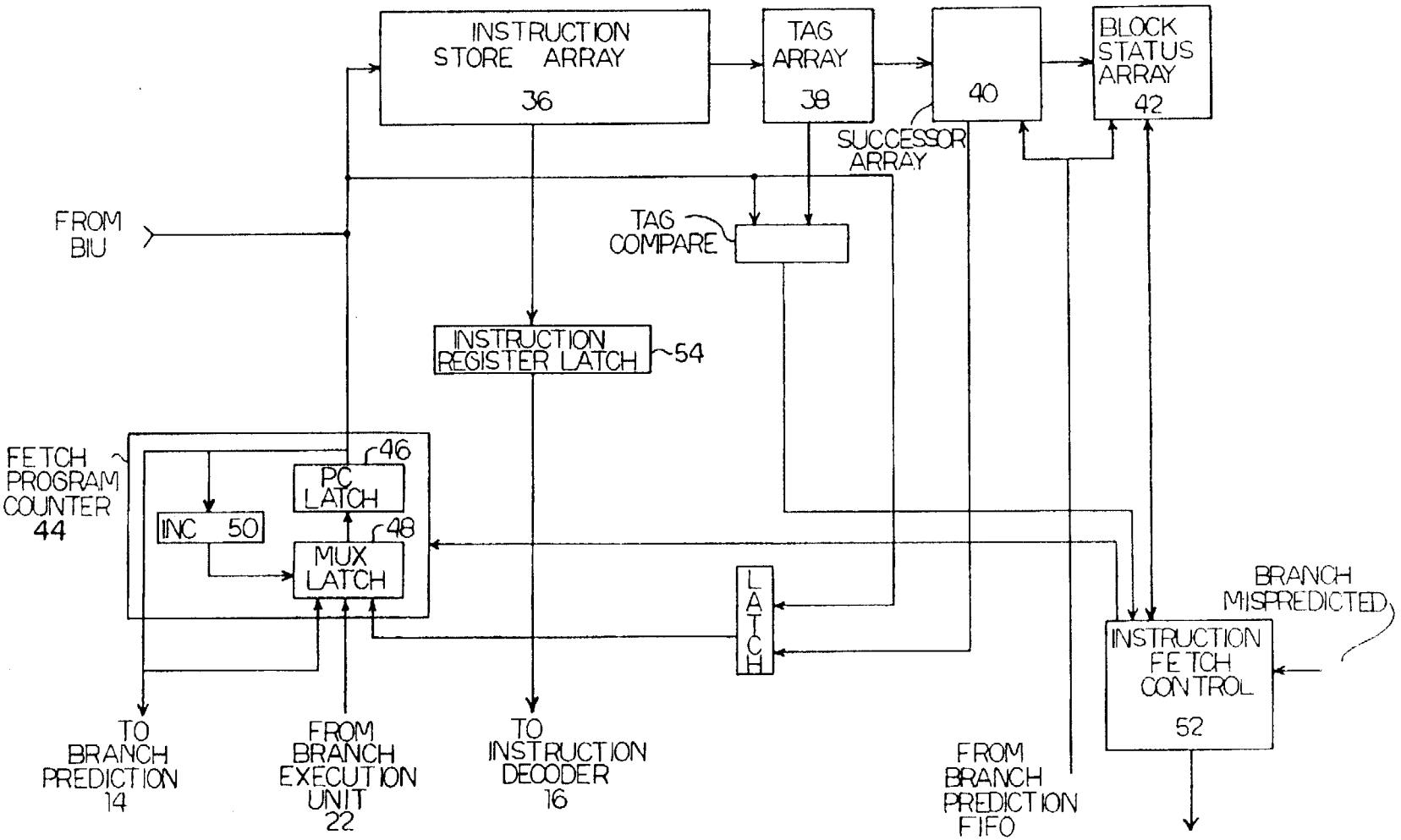
FIG. 8 is a block diagram of an instruction cache employed in the super-scalar processor illustrated in FIG. 7.

As illustrated in FIG. 8, the instruction cache 12 includes an instruction store array 36 which is a direct mapped instruction cache organized as 512 instruction blocks of four words each, a tag array 38 having 512 entries composed of a 19 bit tag and a single valid bit for the entire block, a dual ported successor array 40 having 512 entries composed of an 11 bit successor index and a successor valid bit which indicates when set that the successor index stored in the successor array [340] *40* should be used to access the instruction store array 36, and indicates when cleared that no branch is predicted within the instruction block, a dual ported block status array 42 that contains a branch block indicator for each instruction block in the instruction cache 12 which indicates the last instruction predicted to be executed within a block, a fetch program counter (PC) 44 (including a PC latch 46, a MUX unit 48 and an incrementer (INC) 50) that generates a PC value that is used for prefetching the instruction stream from the instruction cache 12, an instruction fetch control unit 52 that controls the fetching of instructions from the instruction cache 12, the replacement of cache blocks on misses, and the reformatting of the successor array 40 and branch block array 42 on branches that are mispredicted, and an instruction register latch 54 which is loaded with the instructions to be provided to the instruction decoder 16.

Figure 9:
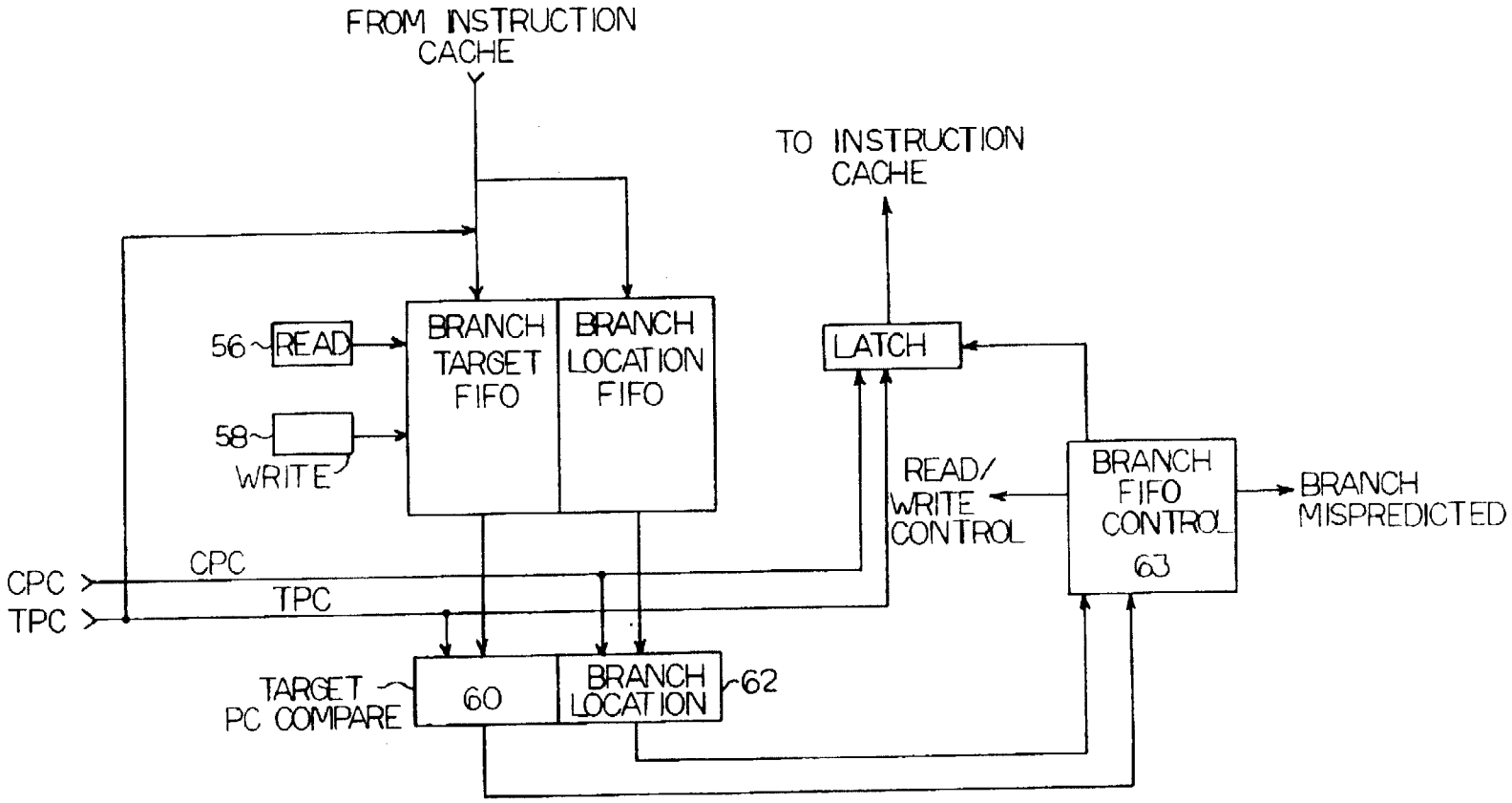
FIG. 9 is a block diagram of a branch prediction FIFO employed in the super-scalar processor illustrated in FIG. 7.

The branch prediction FIFO 14 is used to maintain information related to every predicted branch within an instruction block. Specifically, the location in the cache where the branch is predicted to occur (i.e. the branch location) as well as the predicted branch target PC of the branch are stored within the branch prediction FIFO 14. As illustrated in FIG. 9, the branch prediction FIFO 14 is preferably implemented as a fixed array with a target PC FIFO and a branch location FIFO, incrementing read/write pointers 56 and 58, and also includes a target PC comparator 60 and a branch location comparator 62 which are respectively coupled to a branch location data bus (CPC) and a target PC data bus (TPC). The output signals generated by the target PC comparator 60 and the branch location PC comparator 62 are provided to a branch FIFO control circuit 63. The FIFO 14 could alternatively be implemented as a shiftable array or a circular FIFO.

Figure 10:
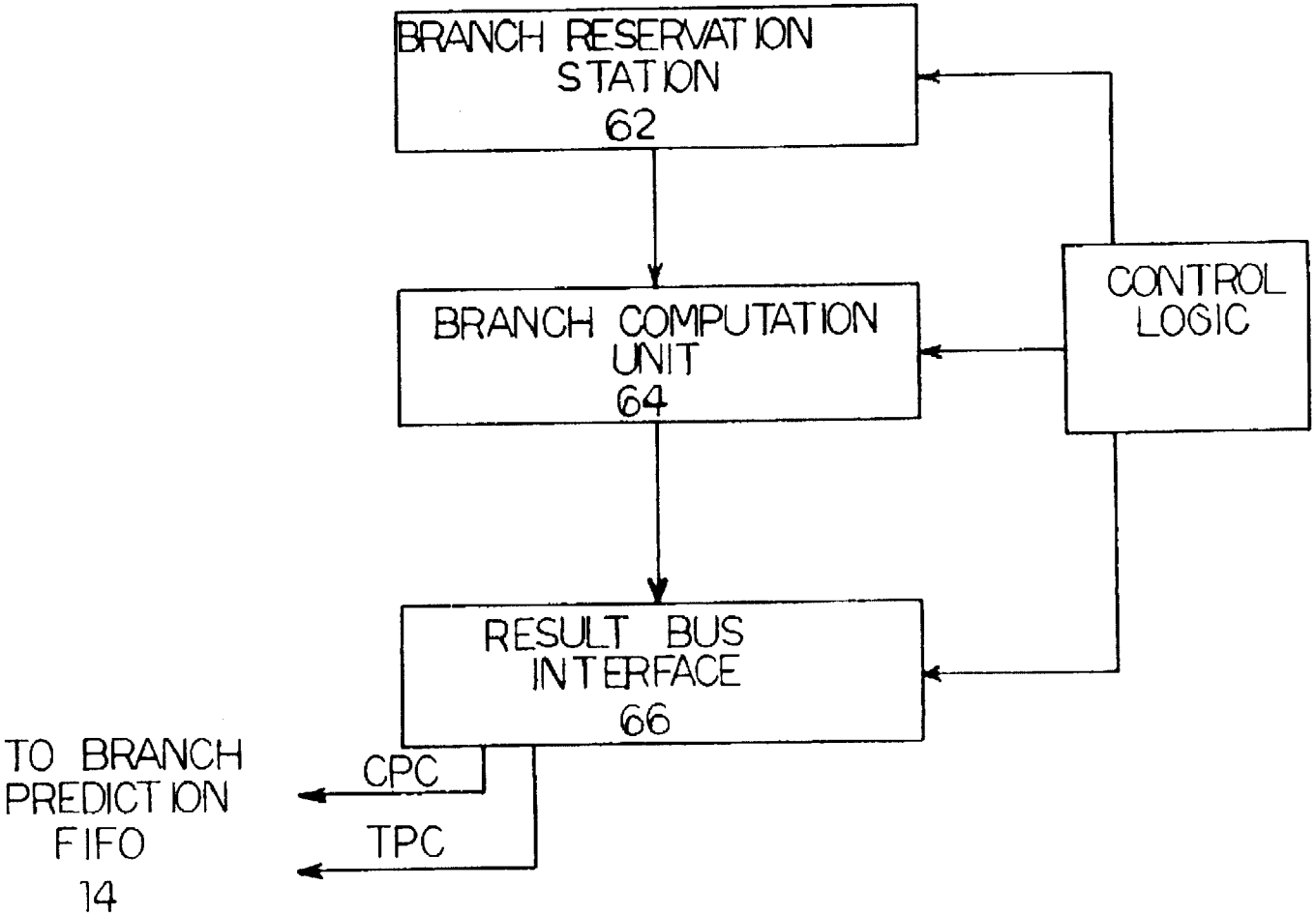
FIG. 10 block diagram of a branch execution unit employed in the super-scalar processor illustrated in FIG. 7.

The branch execution unit 22 contains the hardware that actually executes the branch instructions and writes the branch results back to the reorder buffer 18 As shown in FIG. 10, the branch execution unit 22 includes a branch reservation station 62, a branch computation unit 64 and a result bus interface 66. The reservation station 62 is a FIFO array which receives decoded instructions from the instruction decoder 16 and operand information from the register file 18 and reorder buffer 20 and holds this information until the decoded instruction is free from dependencies and the branch computation unit 64 is free to execute the instruction. The result bus interface 66 couples the branch execution unit 22 to the CPC bus and TPC bus, which in turn are coupled to the branch location comparator 62 and the target PC comparator 60 of the branch predication FIFO 14 as illustrated in FIG. 9.

In operation, the instruction cache 12 is loaded with instructions from an instruction memory via the BIU 10. The fetch PC 44 supplies a predicted fetch PC value to the instruction cache 12 in order to prefetch an instruction stream. As previously stated, the successor valid bit for each instruction block is cleared when the instruction block is first loaded into the instruction cache 12. Thus, when a given instruction block is first fetched from the instruction cache 12, any branch in the block is predicted as not taken. The prefetched instruction block is supplied to the instruction decoder 16 via the instruction decode latch 54. The predicted fetch PC is then incremented via the incrementer 50 and loaded back into the fetch PC latch 46 via the MUX unit 48. The resulting fetch PC is then supplied to the instruction cache 12 in order to fetch the next sequential instruction block in the instruction store.

The branch execution unit 22 processes any branch instruction contained in the first prefetched instruction block, and generates an actual PC value and target PC value for the executed branch instruction. Note, that if the branch is not taken on execution, the target PC value generated by the branch execution unit 22 will be the next sequential value after the actual PC value, i.e., the term "target PC" in this sense does not necessarily mean the target of an executed branch, but instead indicates the address of the next instruction block to be executed regardless of the branch results. The actual PC value and the target PC value are respectively supplied to the CPC bus and the TPC bus and loaded into the branch location comparator and the target PC comparator in the branch prediction FIFO.

Where a branch was predicted *as* not taken but was taken on execution, the comparison of the actual PC value supplied by the branch instruction unit 22 with the branch location value supplied from the branch location FIFO of the branch prediction FIFO 14 will fail. The branch prediction FIFO 14 resets and generates a branch misprediction signal which is supplied to the instruction fetch control unit of the instruction cache 12. The target PC from the branch execution unit 22 is then loaded into the fetch PC latch 46 via the MUX unit 48 and the successor array is updated to set the successor valid bit under control of the instruction fetch control circuit 52. Thus, the branch will be predicted as taken on subsequent fetches of the instruction block.

When the successor valid bit is set indicating a branch is predicted as taken, the value of the fetch PC latch is loaded into the next available entry in the branch prediction FIFO. A reconstructed predicted fetch PC formed from the successor index and the tag field read out of the tag array is loaded via the MUX 48 into the fetch PC latch 46. This reconstructed fetch PC is supplied to the instruction store array 36 to fetch the next instruction and to the branch prediction FIFO. Thus, the branch prediction FIFO entry contains the branch location of the branch as well as the predicted target of the branch.

The branch execution unit 22 subsequently executes the branch instruction and generates an actual PC value and a target PC value which are supplied to the branch location comparator and the target PC comparator in the branch prediction FIFO. If the branch was predicted to be taken, the PC value generated by the branch execution unit 22 will always match the branch location loaded from the branch location FIFO. Three possible conditions, however, will result in the target PC value generated by the branch execution unit 22 not matching the target PC stored in the branch prediction FIFO 14: the branch was predicted as taken but was not taken in which case the successor valid bit must be cleared, the branch executed a subroutine return to an address which did not match the predicted address thereby requiring the successor index be updated, or cache replacement occurred prior to the execution of the branch instruction requiring the reloading of the instruction cache.

The principal hardware cost of the above-described branch prediction scheme is the increase in the cache size caused by the successor index and branch block index fields associated with each entry in the instruction cache. This increase is minimal when compared with other hardware prediction schemes, however, as the present invention saves storage space by predicting only one taken branch per cache block, and predicting non-taken branches by not storing any branch information associated with the instruction block into the successor index. For an 8 Kbyte direct mapped cache, the additional fields add about 8% to the cache storage required. The increase in overall system performance due to branch prediction, however, justifies the increased size requirement for the instruction cache.

The requirement for updating the cache entry when a branch is mispredicted does conflict with the requirement to fetch the correct branch target, i.e., unless it is possible to read and write the fetch information for two different entries simultaneously, the updating of the fetch information on a mispredicted branch takes a cycle away from instruction fetching. The requirement for an additional cycle causes only a small degradation in performance, however, as mispredicted branches occur infrequently and the increase in performance associated with branch prediction easily outweigh any degradation in performance due to the additional cycles required mispredicted branches.

The invention has been described with particular reference to certain preferred embodiments thereof. The invention is not limited to these disclosed embodiments and modifications and variations may be made within the scope of the appended claims.

What is claimed is:

1. A branch prediction method, comprising *the steps of*:

a. loading a plurality of instruction blocks into an instruction cache memory, each of said instruction blocks comprising a plurality of instructions and instruction fetch information, wherein said instruction fetch information comprises an address tag, a predicted target branch address, a branch block index and a successor index that includes a successor valid bit;

b. generating and supplying a fetch program counter *value* to said instruction cache memory in order to prefetch one of said plurality of instruction blocks [and store] *stored* in said instruction cache memory;

c. determining whether said successor valid bit of said prefetched instruction block is set to a predetermined condition which indicates that a branch instruction within said prefetched instruction block is predicted as taken;

d. [incrementing said fetch program counter and supplying the incremented fetch program counter value to said instruction cache memory to prefetch a succeeding instruction block if said successor valid bit is not set to said predetermined condition, and] generating a branch location address indicative of the location of said branch instruction within said instruction [memory] cache *memory* and a predicted target branch address if said successor valid bit is set to said predetermined condition;

e. storing said predicted target branch address and said branch location address in a branch prediction memory *if said successor valid bit is set to said predetermined condition*;

f. *incrementing said fetch program counter value and supplying the incremented fetch program counter value to said instruction cache memory to prefetch a succeeding instruction block if said successor valid bit is not set to said predetermined condition;*

*g*. executing said branch instruction with an execution unit and generating an actual branch address and a target branch address for the executed branch instruction;

[g.] *h*. comparing said actual *branch* address generated by said execution unit with said branch location *address* stored in said branch prediction memory and generating a *first* misprediction signal if *a branch corresponding to said branch instruction was taken on execution and either* said actual *branch* address is not equal to said branch location *address or said executed target branch address is not equal to said predicted target branch address stored in said branch prediction memory*;

[h.] *i*. comparing [the executed target] *said actual* branch address with [the predicted] *said* branch *location* address stored in said branch prediction memory and generating a *second* misprediction signal if [the executed target] *said branch corresponding to said branch instruction was not taken on execution and said actual* branch address is [not] equal to [the predicted target] *said* branch *location* address;

[i.] *j*. updating the successor valid bit and instruction fetch information for said instruction block in response to said *first or second* misprediction signal; and

[j.] *k*. updating said *fetch* program counter value with the target branch address *in response to said first or second misprediction signal*.

2. A method as set forth in claim 1, wherein said predicted target branch address is generated by concatenating said successor index of said prefetched instruction block to an address tag of a successor instruction block.

3. A method as set forth in claim 2, wherein said branch location *address* is generated by concatenating a successor index from a preceding instruction block [with the branch location address] *to an address tag* of said prefetched instruction block.

4. An apparatus comprising:

a. first means for storing a plurality of instruction blocks, each of said instruction blocks comprising a plurality of instructions and instruction fetch information, wherein said instruction fetch information comprises an address tag, a predicted target branch address, a branch block index and a successor index that includes a successor valid bit;

b. second means for generating and supplying a fetch program counter value to said first means in order to prefetch one of said plurality of instruction blocks [and store] *stored* in said first means;

c. third means for determining whether said successor valid bit of said prefetched instruction block is set to a predetermined condition which indicates that a branch instruction within said prefetched instruction block is predicted as taken;

d. fourth means for [incrementing said fetch program counter and supplying the incremented fetch program counter value to said first means to prefetch a succeeding instruction block if said successor valid bit is not set to said predetermined condition;

e. fifth means for] generating a branch location address and a predicted target branch address if said successor valid bit is set to said predetermined condition;

[f. sixth]

*e. fifth* means for storing said predicted target branch address and said branch location address *if said successor valid bit is set to said predetermined condition*;

[g. seventh]

*f. sixth* means for *incrementing said fetch program counter value and supplying the incremented fetch program counter value to said instruction cache memory to prefetch a succeeding instruction block if said successor valid bit is not set to said predetermined condition;*

*g. seventh means for* executing said branch instruction and generating an actual branch address and a target branch address for the executed branch instruction;

h. eighth means for comparing said actual *branch* address generated by said seventh means with said branch location *address* stored in said sixth means and *generating a first misprediction signal if a branch corresponding to said branch instruction was taken on execution and either said actual branch address is not equal to said branch location address or said executed target branch address is not equal to said predicted branch address stored in said sixth means;*

*i. ninth means* for comparing [the executed target] *said actual* branch address with [the predicted] *said* branch *location* address stored in said [branch prediction memory] *sixth means* and generating a *second* misprediction signal [based on the result of said comparisons] *if said branch corresponding to said branch instruction was not taken on execution and said actual branch address is equal to said branch location address*;

[i. ninth means]

*j. tenth means* for updating the successor valid bit and instruction fetch information for said instruction block in response to said *first or second* misprediction signal; and

[j.] *k. eleventh means for* updating said *fetch* program counter value with the target branch address *in response to said first or second misprediction signal.*

5. An apparatus as claimed in claim 4, wherein said [seventh] *fourth* means generates said predicted target branch address by concatenating said successor index of said prefetched instruction block to an address tag of a successor instruction block.

6. A method as set forth in claim 4, wherein said [seventh] *fourth* means generates said branch location *address* by concatenating a successor index from a preceding instruction block [with the branch location address] *to an address tag* of said prefetched instruction block.

7. An apparatus comprising:

a bus interface unit, an instruction cache memory coupled to said bus interface unit and configured to receive a plurality of instruction blocks, each of said instruction blocks comprising a plurality of instructions and instruction fetch information, wherein said instruction fetch information comprises an address tag, a branch block index and a successor index that includes a successor valid bit;

a branch prediction memory coupled to said instruction cache memory;

an instruction decoder coupled to said instruction cache memory, [an instruction branch memory coupled to said instruction cache memory,] wherein when said successor valid bit is not set to a predetermined condition, a fetch program counter value is incremented and supplied to said instruction cache memory for prefetching a succeeding instruction block, and when said successor valid bit is set to the predetermined condition, a predicted target branch address is generated by said instruction cache memory based on information contained in said instruction fetch information and said predicted target branch address within the instruction cache memory is stored in said branch prediction [said] memory; and a processing unit including a branch execution unit coupled to said instruction decoder and a register file, wherein said branch instruction is subsequently executed with said branch execution unit which generates an actual branch location address and a target branch address for said executed branch instruction and said actual branch location *address* and the target branch address are respectively compared with the branch location *address* and said predicted target branch address stored in the branch prediction memory, generating a misprediction signal if *said branch instruction was taken on execution and* the compared values are not equal, and said successor valid bit and said instruction fetch information being updated for the instruction block in response to the misprediction signal and updating said *fetch* program counter value with the target branch address *in response to the misprediction signal.*

8. An apparatus as claimed in claim 7, wherein said instruction cache memory includes an instruction store array coupled to said bus interface unit, a tag array coupled to said instruction store array, a successor array coupled to said tag array, and a block status array coupled to said successor array.

9. An apparatus as claimed in claim 8, wherein said instruction cache memory further comprises a fetch program counter that includes a PC latch, an incrementer, and a MUX unit.

10. An apparatus as claimed in claim 9, wherein said instruction cache memory further comprises an instruction fetch control circuit coupled to said fetch program counter, wherein said instruction fetch control circuit controls the operation of said Mux unit to selectively load the PC latch with a value generated by said incrementer, a value supplied by said branch [control] *execution* unit, or a reconstructed fetch PC value.

11. An apparatus as claimed in claim 7, wherein said branch prediction memory comprises a branch target FIFO and a branch location FIFO.

12. An apparatus as claimed in claim 11, wherein said branch prediction memory further comprises a target PC comparator coupled to said branch target FIFO and a bus that is coupled to said branch execution unit, and a branch location comparator coupled to said branch location FIFO and a bus that is coupled to said branch execution unit, wherein the output of said target PC comparator and said branch location comparator are coupled to a control circuit.

*13. A branch prediction method comprising the steps of:*

*a. loading a plurality of instruction blocks into an instruction cache memory, each of said instruction blocks comprising a plurality of instructions and instruction fetch information, wherein said instruction fetch information comprises a successor index indicative of a predicted target branch address and a successor valid bit;*

*b. generating and supplying a fetch program counter value to said instruction cache memory in order to prefetch one of said plurality of instruction blocks stored in said instruction cache memory;*

*c. determining whether said successor valid bit of said prefetched instruction block is set to a predetermined condition which indicates that a branch instruction within said prefetched instruction block is predicted as taken;*

*d. generating a branch location address indicative of the location of said branch instruction within said instruction cache memory and a predicted target branch address if said successor valid bit is set to said predetermined condition;*

*e. storing said predicted target branch address and said branch location address in a branch prediction memory if said successor valid bit is set to said predetermined condition;*

*f. incrementing said fetch program counter value and supplying the incremented fetch program counter value to said instruction cache memory to prefetch a succeeding instruction block if said successor valid bit is not set to said predetermined condition;*

*g. executing said branch instruction with an execution unit and generating an actual branch address and a target branch address for the executed branch instruction;*

*h. comparing said actual branch address generated by said execution unit with said branch location address stored in said branch prediction memory and generating a first misprediction signal if said branch instruction was taken on execution and either said actual branch address is not equal to said branch location address or said executed target branch address is not equal to said predicted target branch address stored in said branch prediction memory;*

*i. comparing said actual branch address with said branch location address stored in said branch prediction memory and generating a second misprediction signal if said branch instruction was not taken and said actual branch address is equal to said branch location address;*

*j. updating the successor valid bit and instruction fetch information for said instruction block in response to said first or second misprediction signal; and*

*k. updating said fetch program counter value with the target branch address in response to said first or second misprediction signal.*

*14. A method as set forth in claim 13, wherein said instruction fetch information further comprises an address tag and wherein said predicted target branch address is generated by concatenating said successor index of said prefetched instruction block to an address tag of a successor instruction block.*

*15. A method as set forth in claim 14, wherein said branch location address is generated by concatenating a successor index from a preceding instruction block to an address tag of said prefetched instruction block.*

*16. An apparatus comprising:*

*a. first means for storing a plurality of instruction blocks, each of said instruction blocks comprising a plurality of instructions and instruction fetch information, wherein said instruction fetch information comprises a successor index indicative of a predicted target branch address and a successor valid bit;*

*b. second means for generating and supplying a fetch program counter value to said first means in order to prefetch one of said plurality of instruction blocks stored in said first means;*

*c. third means for determining whether said successor valid bit of said prefetched instruction block is set to a predetermined condition which indicates that a branch instruction within said prefetched instruction block is predicted as taken;*

*d. fourth means for generating a branch location address and a predicted target branch address if said successor valid bit is set to said predetermined condition;*

*e. fifth means for storing said predicted target branch address and said branch location address if said successor valid bit is set to said predetermined condition;*

*f. sixth means for incrementing said fetch program counter value and supplying the incremented fetch program counter value to said first means to prefetch a succeeding instruction block if said successor valid bit is not set to said predetermined condition;*

*g. seventh means for executing said branch instruction and generating an actual branch address and a target branch address for the executed branch instruction;*

*h. eighth means for comparing said actual branch address generated by said seventh means with said branch location address stored in said sixth means and generating a first misprediction signal if a branch corresponding to said branch instruction was taken on execution and either said actual branch address is not equal to said branch location address or said executed target branch address is not equal to said predicted target branch address stored in said fifth means;*

*i. ninth means for comparing said actual branch address with said branch location address stored in said sixth means and generating a second misprediction signal if said branch instruction was not taken on execution and said actual branch address is equal to said branch location address;*

*j. tenth means for updating the successor valid bit and instruction fetch information for said instruction block in response to said first or second misprediction signal; and* k. eleventh means for updating said fetch program counter value with the target branch address in response to said first or second misprediction signal.

17. An apparatus as claimed in claim 16, wherein said instruction fetch information further comprises an address tag and wherein said fourth means generates said predicted target branch address by concatenating said successor index of said prefetched instruction block to an address tag of a successor instruction block.

18. A method as set forth in claim 16, wherein said instruction fetch information further comprises an address tag and wherein said fourth means generates said branch location address by concatenating a successor index from a preceding instruction block to an address tag of said prefetched instruction block.

19. An apparatus comprising:

an instruction cache memory configured to receive a plurality of instruction blocks, each of said instruction blocks comprising a plurality of instructions and instruction fetch information, wherein said instruction fetch information comprises a successor index indicative of a predicted target branch address and a successor valid bit;

a branch prediction memory coupled to said instruction cache memory;

an instruction decoder coupled to said instruction cache memory, wherein when said successor valid bit is not set to a predetermined condition, a fetch program counter value is incremented and supplied to said instruction cache memory for prefetching a succeeding instruction block, and when said successor valid bit is set to the predetermined condition, a predicted target branch address is generated for a branch location address by said instruction cache memory based on information contained in said instruction fetch information, and wherein said predicted target branch address and said branch location address are stored in said branch prediction memory; and a processing unit including a branch execution unit coupled to said instruction decoder, wherein said branch instruction is subsequently executed by said branch execution unit which generates an actual branch location address and a target branch address for said executed branch instruction and said actual branch location address and the target branch address are respectively compared with the branch location address and said predicted target branch address stored in the branch prediction memory, generating a misprediction signal if a branch corresponding to said branch instruction was taken on execution and the compared values are not equal, and said successor index being updated for the instruction block in said instruction cache memory in response to the misprediction signal and updating said fetch program counter value with the target branch address in response to said misprediction signal.

20. An apparatus as claimed in claim 19, wherein said instruction cache memory includes an instruction store array, a tag array coupled to said instruction store array, a successor array coupled to said tag array, and a block status array coupled to said successor array.

21. An apparatus as claimed in claim 20, wherein said instruction cache memory further comprises a fetch program counter that includes a PC latch, an incrementer, and a MUX unit.

22. An apparatus as claimed in claim 21, wherein said instruction cache memory further comprises an instruction fetch control circuit coupled to said fetch program counter, wherein said instruction fetch control circuit controls the operation of said MUX unit to selectively load the PC latch with a value generated by said incrementer, a value supplied by said branch control unit, or a reconstructed fetch PC value.

23. An apparatus as claimed in claim 19, wherein said branch prediction memory comprises a branch target FIFO and a branch location FIFO.

24. An apparatus as claimed in claim 23, wherein said branch prediction memory further comprises a target PC comparator coupled to said branch target FIFO and a bus that is coupled to said branch execution unit, and a branch location comparator coupled to said branch location FIFO and a bus that is coupled to said branch execution unit, wherein the output of said target PC comparator and said branch location comparator are coupled to a control circuit.

25. An apparatus for prefetching branch instructions for a processor, comprising:

a. first means for storing a plurality of instruction blocks, each of said instruction blocks comprising a plurality of instructions and instruction fetch information, wherein said instruction fetch information comprises an index field indicating a succeeding instruction block predicted to be fetched and a branch/no branch prediction;

b. second means for generating and supplying a fetch program counter value to said first means in order to prefetch one of said plurality of instruction blocks stored in said first means as a prefetched instruction block;

c. third means for reading said instruction fetch information of said prefetched instruction block and incrementing said fetch program counter value and supplying said incremented fetch program counter value to said first means if said branch/no branch prediction stored within said instruction fetch information of said prefetched instruction block indicates a no branch condition, and updating said fetch program counter value with said succeeding instruction block stored in said instruction fetch information of said prefetched instruction block if said branch/no branch prediction stored within said instruction fetch information of said prefetched instruction block indicates a branch condition;

d. fourth means for storing a branch location address and a corresponding predicted target branch address if said branch/no branch prediction stored within said instruction fetch information of said prefetched instruction block indicates said branch condition;

e. fifth means for executing a branch instruction contained in said prefetched instruction block and generating an actual target branch address as a result of said execution of said branch instruction;

f. sixth means for comparing said actual target branch address with said predicted target branch address corresponding to said branch instruction stored in said fourth means, wherein when a branch corresponding to said branch instruction was taken on execution and said comparison result indicates that said branch location address stored in said fourth means corresponds to said branch instruction executed by said fifth means and said predicted target branch address is not equivalent to said actual target branch address, sending a first update signal to said first means to replace said index field with said actual target branch address; and

*g. seventh means for comparing said branch location address stored in said fourth means with an address of said branch instruction executed by said fifth means and for sending a second update signal to said first means to update said branch/no branch prediction to said no branch condition if said branch corresponding to said branch instruction was not taken on execution and said comparison result indicates that said address of said branch instruction is equal to said branch location address stored in said fourth means.*

*26. A method of prefetching branch instructions for a processor, comprising the steps of:*

*a. loading a plurality of instruction blocks into an instruction cache memory, wherein each of said instruction blocks comprises a plurality of instructions and instruction fetch information, wherein said instruction fetch information comprises an index field indicating a succeeding instruction block predicted to be fetched and a branch/no branch prediction;*

*b. generating and supplying a fetch program counter value to said instruction cache memory in order to prefetch one of said plurality of instruction blocks as a prefetched instruction block;*

*c. reading said instruction fetch information of said prefetched instruction block and incrementing said fetch program counter value if said branch/no branch prediction stored within said instruction fetch information of said prefetched instruction block indicates a no branch condition, and updating said fetch program counter value with said succeeding instruction block stored in said instruction fetch information of said prefetched instruction block if said branch/no branch prediction stored within said instruction fetch information of said prefetched instruction block indicates a branch condition;*

*d. storing a branch location address and a corresponding predicted target branch address in a branch prediction memory if said branch/no branch prediction stored within said instruction fetch information of said prefetched instruction block indicates said branch condition;*

*e. executing a branch instruction contained in said prefetched instruction block and generating an actual target branch address as a result of said execution of said branch instruction;*

*f. comparing said actual target branch address with said predicted target branch address corresponding to said branch instruction stored in said branch prediction memory, wherein when a branch corresponding to said branch instruction was taken on execution and said comparison result indicates that said branch location address stored in said branch prediction memory corresponds to said executed branch instruction and said predicted target branch address is not equivalent to said actual target branch address, sending a first update signal to said instruction cache memory to replace said index field with said actual target branch address for said corresponding branch instruction; and*

*g. comparing said branch location address stored in said branch prediction memory with an address of said executed branch instruction and for sending a second update signal to said instruction cache memory to update said branch/no branch prediction to said no branch condition if said branch corresponding to said branch instruction was not taken on execution and said comparison result indicates that said address of said branch instruction is equal to said branch location address stored in said branch prediction memory.*

*27. An apparatus for prefetching instructions for a processor, comprising:*

*a. an instruction cache memory configured to receive a plurality of instruction blocks, each of said instruction blocks comprising a plurality of instructions and instruction fetch information, wherein said instruction fetch information comprises an index field indicating a succeeding instruction block predicted to be fetched and a branch/no branch prediction;*

*b. a fetch program counter operatively connected to said instruction cache memory to prefetch one of said plurality of instruction blocks stored in said instruction cache memory as a prefetched instruction block based on a fetch program counter value supplied to said instruction cache memory:*

*c. an instruction fetch control unit operatively connected to said fetch program counter and said instruction cache memory for reading said instruction fetch information of said prefetched instruction block, wherein said instruction fetch control unit sends a signal to said fetch program counter to increment and supply said fetch program counter value to said instruction cache memory if said branch/no branch prediction stored within said instruction fetch information of said prefetched instruction block indicates a no branch condition, and wherein said instruction fetch control unit sends a signal to said fetch program counter to update said fetch program counter value with said succeeding instruction block stored in said instruction fetch information of said prefetched instruction block if said data representing said branch/no branch prediction stored within said instruction fetch information of said prefetched instruction block indicates a branch condition;*

*d. a branch prediction memory coupled to said instruction cache memory for storing a branch location address and a corresponding predicted target branch address if said data representing said branch/no branch prediction stored within said instruction fetch information of said prefetched instruction block indicates said branch condition;*

*e. an execution unit coupled to said branch prediction memory, wherein when said branch instruction is executed by said execution unit, an actual target branch address is generated, and when a branch corresponding to said branch instruction is taken on execution, said actual target branch address is compared to said predicted target branch address stored within said branch prediction memory and said branch location address is compared with an address of said branch instruction executed by said execution unit, and wherein said index field of said instruction cache memory is updated with said actual target branch address if said actual target branch address is not equivalent to said predicted target branch address or if said branch location address is not equivalent to said address of said branch instruction executed by said execution unit, and*

*wherein when execution of said branch instruction by said execution unit results in said branch corresponding to said branch instruction not being taken, said address of said branch instruction executed by said execution unit is compared with said branch location address stored in said branch prediction memory and said branch/no branch pre-*

*diction stored in said instruction cache memory is updated to indicate a no branch condition if said address of said branch instruction executed by said execution unit is equivalent to said branch location address stored in said branch prediction memory.*

* * * * *